United States Patent [19]

Roberts et al.

[11] Patent Number: 4,677,346
[45] Date of Patent: Jun. 30, 1987

[54] DRIVE AND CONTROL CIRCUITS FOR GATE CAPACITANCE LATCH WITH REFRESH LAMP BALLAST

[75] Inventors: Victor D. Roberts, Burnt Hills; Joseph C. Borowiec, Schenectady, both of N.Y.

[73] Assignee: General Electric Company, Schenectady, N.Y.

[21] Appl. No.: 791,831

[22] Filed: Oct. 28, 1985

[51] Int. Cl.[4] .............................................. H05B 37/02
[52] U.S. Cl. .................................... 315/226; 315/205; 315/208; 315/224; 315/DIG. 7
[58] Field of Search ................. 315/226, 224, DIG. 7, 315/208, 205

[56] References Cited

U.S. PATENT DOCUMENTS 4,170,747 10/1979 Holmes ................................ 315/224
4,388,563 5/1981 Hyltin ................................. 315/226
4,495,446 1/1985 Brown et al. ........................ 315/206

Primary Examiner—Harold Dixon
Attorney, Agent, or Firm—Marvin Snyder; James C. Davis, Jr.

[57] ABSTRACT

A switched AC ballast is operated synchronously with the AC line during normal running of a gas discharge lamp to limit EMI and is locked in a single phase during start-up (i.e. ignition, glow mode and warm-up) to protect the bridge switches from high voltage starting signals. Devices having a high impedance control input, such as FETs, are employed in the switching bridge thus allowing control of the upper devices in the bridge without a floating power supply. A control circuit insures proper operation of the bridge switches during all operating modes of the discharge lamp.

8 Claims, 6 Drawing Figures

LOGIC WAVEFORMS DURING STARTING
OUTPUT SIGNAL
OF
COMPARATOR 80
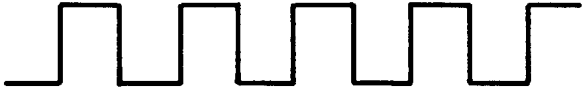
Q OUTPUT SIGNAL
OF
FLIP-FLOP 88
Q̄ OUTPUT SIGNAL
OF
FLIP-FLOP 88
Q OUTPUT SIGNAL
OF
ONE-SHOT 83
OUTPUT SIGNAL
OF OR GATE 120
SIGNAL 3
OUTPUT SIGNAL
OF OR GATE 121
SIGNAL 4
OUTPUT SIGNAL
OF AND GATE 122,
NOR GATE 128 &
NOR GATE 132
SIGNALS 2, 5 & 6
OUTPUT SIGNAL
OF AND GATE 123
SIGNAL 1
*Fig. 5*

LOGIC WAVEFORMS DURING SWITCHING
OUTPUT SIGNAL OF COMPARATOR 80
Q OUTPUT SIGNAL OF FLIP-FLOP 88
Q̄ OUTPUT SIGNAL OF FLIP-FLOP 88
Q OUTPUT SIGNAL OF ONE-SHOT 83
OUTPUT SIGNAL OF OR GATE 120 — SIGNAL 3
OUTPUT SIGNAL OF OR GATE 121 — SIGNAL 4
OUTPUT SIGNAL OF AND GATE 121 & NOR GATE 132 — SIGNALS 2 & 5
OUTPUT SIGNAL OF AND GATE 123 & NOR GATE 128 — SIGNALS 1 & 6
*Fig. 6*

4,677,346

DRIVE AND CONTROL CIRCUITS FOR GATE CAPACITANCE LATCH WITH REFRESH LAMP BALLAST

BACKGROUND OF THE INVENTION

The present invention relates in general to a ballast for a gas discharge lighting system and more specifically to a switched AC ballast having drive circuits which operate without a floating power source and having a control circuit for correctly controlling the ballast in each operating mode of the gas discharge lamp.

The switched AC ballast typically is comprised of a full-bridge switching circuit or inverter connected to a DC power source for supplying AC power to a lamp. AC operation of the gas discharge lamp avoids undesirable DC operational characteristics such as cataphoresis. It is desirable to obtain the AC voltage by chopping a DC voltage because of the low cost of a DC power supply used in conjunction with a resistive ballasting element and because it enables operating modes of the ballast other than AC during lamp starting, for example. As described in copending application Ser. No. 748,076, filed June 4, 1985, and assigned to the assignee of the present application, electromagnetic interference (EMI) generated by fast switching of the solid-state devices in the switching bridge can be substantially restricted to the ballast by inverting the phase of the switching bridge only when the diodes of the DC power supply rectifier are non-conducting.

In recent years, bipolar transistors in high power applications have begun to be replaced by power Field Effect Transistors (FETs), and most recently, by Insulated Gate Transistors (IGTs). These devices each exhibit a high impedance control input, as opposed to the low impedance control input of the bipolar transistor. A high impedance control input allows the power semiconductor device to be turned on by application of a voltage signal to the control electrode, rather than a current signal as is required for bipolar power devices. This difference in control requirements opens up the possibility of new power device bias and control circuitry.

The full-bridge switching circuit for supplying power to a lamp includes a pair of inverter legs, each leg having an upper and a lower device, with the output of the switching circuit being between the junctions of the upper and lower devices of the inverter legs. In concurrently filed application Ser. No. 791,823 of A. Ferraro which is assigned to the assignee of this application and which is hereby incorporated by reference, a drive circuit is disclosed wherein a gate capacitor is connected across the control inputs of each upper device. The gate capacitors are charged or discharged to turn the associated upper devices on or off, respectively. Charging and discharging of the capacitors is accomplished while the lower devices are turned on. When the lower devices turn off, the upper device capacitors maintain their state of charge or discharge and thus maintain a respective upper device either on or off.

The gate capacitors cannot maintain their charge for an indefinite period of time. Both internal leakage and leakage in the devices to which they are connected cause the voltage across them to drop with time. The amount of time that the gate capacitors can maintain their respective power devices in the on state, the "hold time", is determined by the size of the capacitors, the net leakage, the initial charge voltage, and the minimum gate voltage required to hold each device on. If it is necessary to have a power device on for a period longer than the hold time, the gate capacitors must be recharged or "refreshed". In the case of the upper devices, this requires turning on the appropriate lower device. During this "refresh time", the current through the load (lamp) is interrupted. An important function of the control circuit is to provide signals which insure proper refresh of the gate capacitors under all operating conditions, while maintaining the shortest possible refresh time so that disruption of the lamp current is minimized.

Accordingly, it is a principal object of the present invention to provide a switched AC ballast using a gate capacitance latch for driving the upper devices, wherein the gate capacitors are refreshed whenever required.

It is a further object of the invention to provide a controller circuit for a switched AC ballast, the controller circuit providing correct operation of the AC to AC converter of the ballast in accordance with each operating mode of the gas discharge lamp.

It is another object of the invention to provide a gas discharge lighting system with reduced EMI.

It is another object of the invention to provide a gas discharge lighting system having a reduced cost due to the elimination of the need for a floating power source for driving the upper devices.

SUMMARY OF THE INVENTION

These and other objects are achieved by a controller circuit for controlling an AC to AC converter in a ballast for a gas discharge lighting system. The converter includes a diode rectifier for connecting to an AC source and providing a DC output voltage, a current-limiting impedance having one side connected to one side of the diode rectifier, and a full-bridge switching circuit coupled between the other side of the impedance and the other side of the diode rectifier for converting the DC voltage to an AC voltage.

The full-bridge switching circuit includes a pair of converter legs, each of the legs being comprised of a series-connected pair of upper and lower semiconductor switching devices. Each upper device has a high impedance control electrode.

The lighting system includes an oscillator having its output terminals coupled to the output terminals of the full-bridge switching circuit for providing electrical energy to start the lamp of the lighting system. The controller circuit comprises a diode conduction sensing circuit, an oscillator sensing circuit, an arc sensing circuit, a pair of gate capacitance latch driver circuits and logic means.

The diode conduction sensing circuit is coupled to the inputs and outputs of the rectifier for determining when the diodes in the rectififer are non-conducting. The oscillator sensing circuit is coupled to the oscillator for signaling a starting condition when the oscillator is operating. The arc sensing circuit is coupled to the converter and to the oscillator for disabling the oscillator when current in the lamp exceeds a predetermined value.

Each driver circuit is connected to a respective upper switching device, and each driver circuit includes a gate capacitor, charging means for charging the gate capacitor and discharging means for discharging the gate capacitor. Each of the gate capacitors is connected between the control electrode and a second electrode of its respective upper switching device.

The logic means generates control signals to operate the lamp in starting and normal running conditions, and is coupled to the diode conduction sensing circuit, the oscillator sensing circuit, the driver circuits and the lower switching devices. The logic means locks the full-bridge switching circuit in a single phase during a starting condition while simultaneously refreshing the upper switching device of the phase which is conducting each time the rectifier diodes become non-conducting during the starting condition. The logic means reverses the phase of the full-bridge switching circuit each time the rectifier diodes become non-conducting during a normal running condition.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

FIG. 5 is a waveform diagram of various signals during starting in the circuit of FIG. 4.

FIG. 6 is a waveform diagram of various signals during normal running in the circuit of FIG. 4.

DETAILED DESCRIPTION OF THE INVENTION

Figure 1:
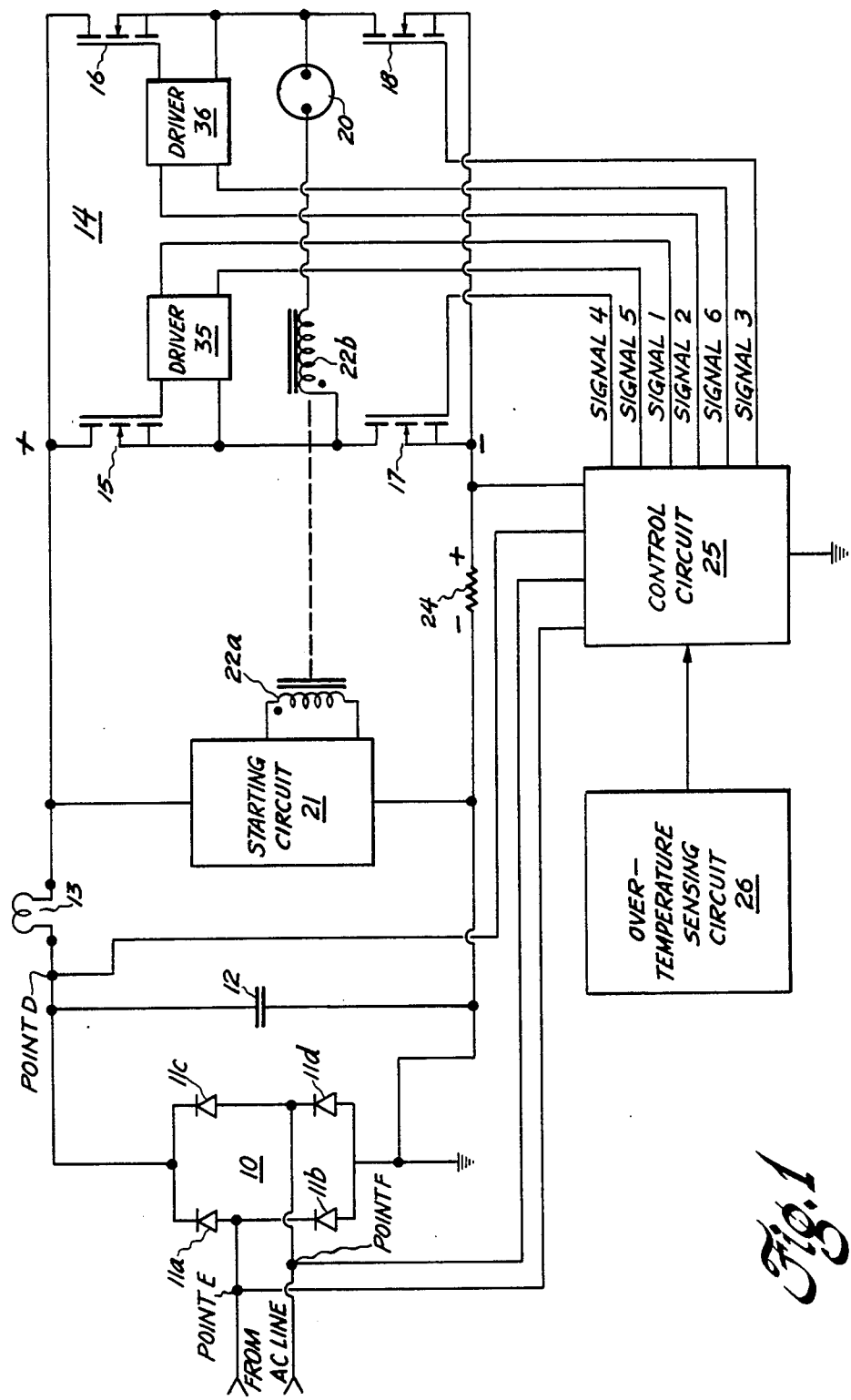
FIG. 1 is a schematic and block diagram of the gas discharge lighting system of the invention.

Referring now to the drawings, FIG. 1 shows a gas discharge lighting system employing the gate capacitance latch with refresh lamp ballast of the invention. The ballast operates as an AC to AC converter for supplying alternating current to a gas discharge lamp 20. Thus, a diode bridge rectifier 10 and a filter capacitor 12 connected across the output terminals of rectifier 10 convert the 60 Hertz AC voltage from the AC line into a DC voltage. The DC voltage is chopped by a full-bridge switching circuit or inverter 14 into an AC voltage during normal operation of lamp 20. Switching bridge 14 includes a pair of converter legs, one leg including an upper switching device 15 and a lower switching device 17 and the other converter leg including an upper switching device 16 and a lower switching device 18. In one operational phase of switching bridge 14, current flows through lamp 20 in one direction by closing switching devices 15 and 18 while devices 16 and 17 are open. The other phase of switching bridge 14 is implemented by closing devices 16 and 17 while devices 15 and 18 are open. Switching devices 15-18 are shown as FETs, but other devices can alternatively be used such as IGTs which are available from General Electric Company, Semiconductor Business Division, Syracuse, N.Y.

An incandescent filament 13 is connected between the positive output side of rectifier 10 and the positive input side of switching bridge 14 for providing resistive ballasting and a source of standby illumination. An arc sensing resistor 24 couples the negative input of switching bridge 14 to circuit common. A starting circuit 21 receives DC power from filament 13. Starting circuit 21 generates high frequency, high voltage pulses to assist in starting an arc in lamp 20. The high frequency, high voltage pulses are coupled to lamp 20 via a transformer having a primary winding 22a and a secondary winding 22b. Primary winding 22a is connected to starting circuit 21, and secondary winding 22b is connected in series with lamp 20.

A control circuit 25 for controlling the operation of the AC to AC converter is connected to point D (the positive output of rectifier 10), to points E and F (the AC line voltage), to the junction of the positive side of arc sense resistor 24 with the negative output side of bridge 14, to circuit common and to an over-temperature sensing circuit 26. Control circuit 25 provides a plurality of control signals to full-bridge switching circuit 14 to control the conduction of switching devices 15-18. Control circuit 25 may also provide a control signal (through a conductor not shown) for inhibiting the operation of starting circuit 21 depending upon the particular embodiment used for starting circuit 21.

Since lower switching devices 17 and 18 are typically comprised of FETs, they may be operated directly from the outputs of control circuit 25. For example, FET 17 turns on when SIGNAL 4 is at a high level and turns off when SIGNAL 4 is at a low level. If the output voltage from control circuit 25 were too low to operate lower FETs 17 and 18 directly, a buffer circuit with a voltage gain greater than one could also be used.

Upper FETs 15 and 16 cannot be driven directly from the outputs of relatively low voltage level control circuit 25 (e.g. 15 volts DC) because they are not referenced to circuit common as are lower FETs 17 and 18. Thus, a pair of driver circuits 35 and 36 are coupled between control circuit 25 and upper FETs 15 and 16, respectively. Upper FETs 15 and 16 are turned on by a high level of SIGNALS 1 and 2, respectively, and are turned off by a high level of SIGNALS 5 and 6, respectively, but only when the lower FET device of the same leg to which each is connected is conducting.

Over-temperature sensing circuit 26 is electrically coupled to control circuit 25. In response to a ballast temperature over a predetermined threshold (e.g. in the range of 100°–150° C.) over-temperature sensing circuit 26 causes control circuit 25 to shutdown operation of the lighting system.

Figure 2:
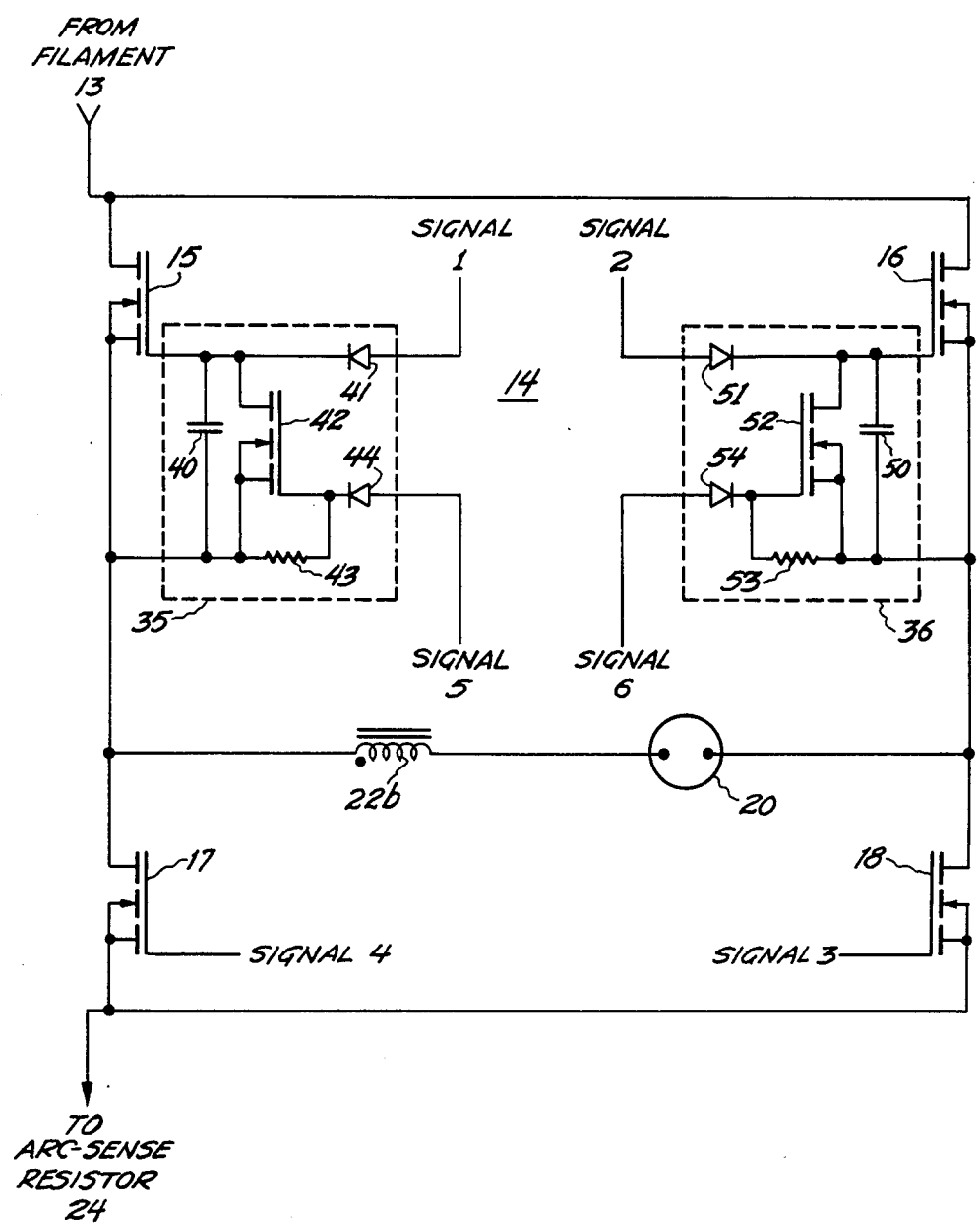
FIG. 2 is a schematic diagram showing the full-bridge switching circuit and driver circuits of FIG. 1 in greater detail.

Turning now to FIG. 2, driver circuits 35 and 36 are shown in greater detail. In driver circuit 35, a gate capacitor 40 is connected between the control or gate electrode and the negative electrode of FET 15. A diode 41 couples SIGNAL 1 to the gate electrode of FET 15 and to the positive side of gate capacitor 40. A discharge FET 42 is coupled across capacitor 40. A resistor 43 is connected between the gate and negative electrode of discharge FET 42. A diode 44 couples SIGNAL 5 to the gate electrode of discharge switch 42. When SIGNAL 1 is high, current flows through diode 41 into gate capacitor 40, but only if FET 17 is turned on to bring the negative side of gate capacitor 40 to near circuit common. When SIGNAL 5 is high, discharge FET 42 turns on only if FET 17 is on. The turn on of discharge FET 42 discharges gate capacitor 40 to turn off FET 15. Driver circuit 36 operates in a similar manner with a gate capacitor 50 being charged in response to a high level of SIGNAL 2 and discharged in response to a high level of SIGNAL 6.

Figure 3:
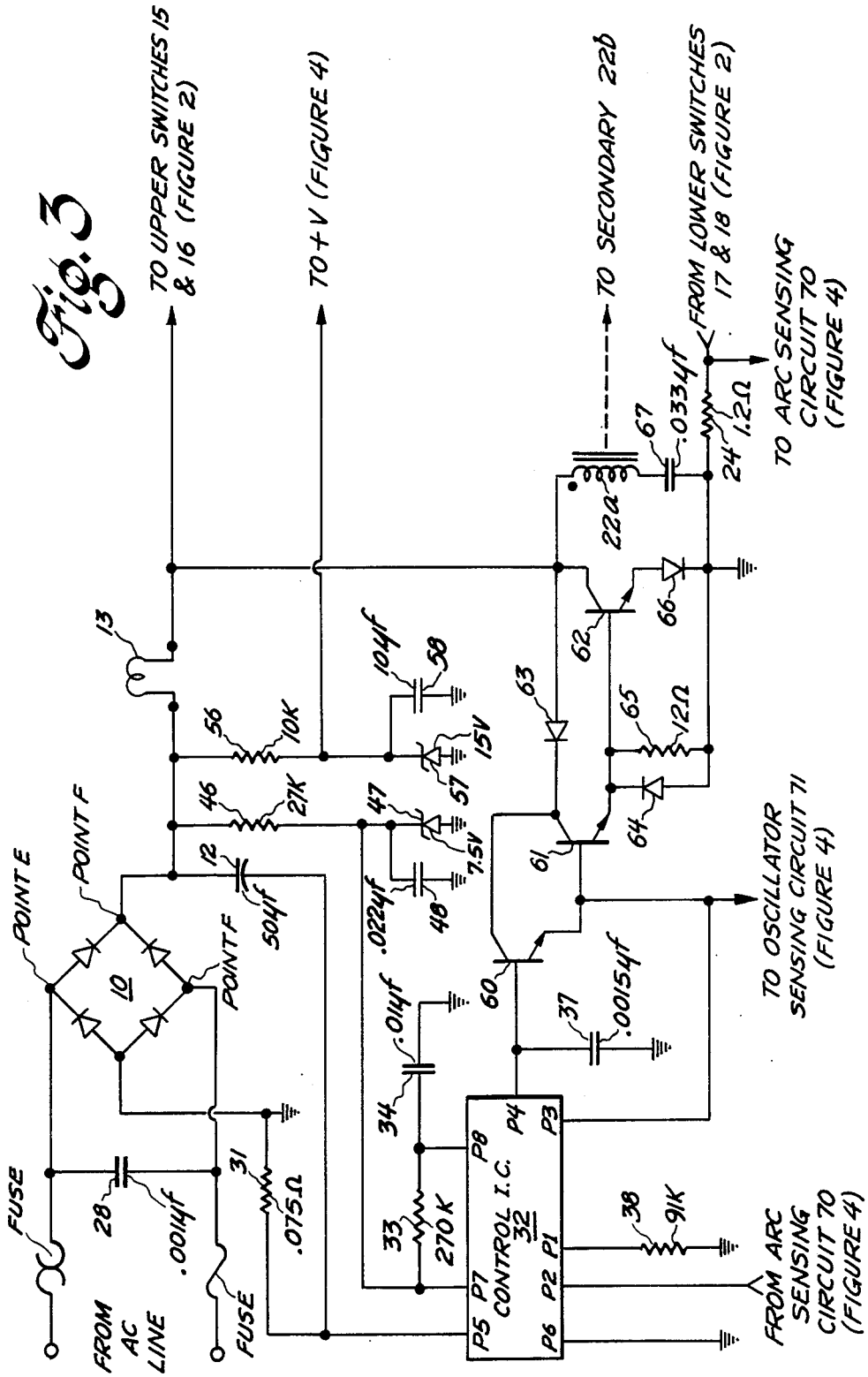
FIG. 3 is a schematic diagram showing the starting circuit of FIG. 1 in greater detail.

FIG. 3 is a schematic diagram of a portion of the lighting system shown in FIG. 1. The circuit includes a control integrated circuit (IC) 32 and associated circuitry which is described in U.S. Pat. No. 4,495,446 entitled, "Lighting Unit With Improved Control Sequence", issued to Brown et al. on Jan. 22, 1985, and assigned to the assignee of the present application. The patent is hereby incorporated by reference.

A diode bridge rectifier 10 is coupled to the AC line. Filter capacitor 12 is coupled across the outputs of rectifier 10 and is connected in series with a resistor 31, with clock signals generated across resistor 31 being provided to control IC 32. Filament 13 couples DC power to full-bridge switching circuit 14 of FIG. 2. A resistor 46 and a zener diode 47 (typically rated at 7.5 volts) are connected in series from point D (the positive side of filter capacitor 12) to circuit common. A capacitor 48 is connected across zener diode 47. The voltage across zener diode 47 and capacitor 48 is a regulated DC voltage which is provided to terminal P7 of control IC 32. A resistor 56 and a zener diode 57 (typically rated at 15 volts) are connected in series between point D and circuit common. A capacitor 58 is connected across zener diode 57, providing a DC voltage +V to control logic circuits in FIG. 4 which wil be described hereinbelow.

Terminal P1 of control IC 32 is coupled to circuit common through a resistor 38. Terminal P2 is connected to an arc sensing circuit 70 in FIG. 4, described below. Terminal P3 is connected to an oscillator sensing circuit 71 also shown in FIG. 4. Terminal P4 is coupled to circuit common through a capacitor 37 and is connected to the base of a transistor 60. Terminal P5 is connected to the junction between filter capacitor 12 and resistor 31. Terminal P6 is connected to circuit common. A resistor 33 is connected between terminals P7 and P8. A capacitor 34 couples terminal P8 to circuit common.

The collector of transistor 60 is connected to the collector of a transistor 61 and to the cathode of a diode 63. The emitter of transistor 60 is connected to the base of transistor 61, to terminal P3 of control IC 32 and to oscillator sensing circuit 71 of FIG. 4. The emitter of transistor 61 is connected to the base of a transistor 62, to the cathode of a diode 64 and to one side of a resistor 65. The collector of transistor 62 is connected to the anode of diode 63, the dotted terminal of primary winding 22a and to the junction between filament 13 and switching bridge 14. The emitter of transistor 62 is coupled to circuit common through a diode 66. The anode of diode 64 and the other side of resistor 65 are also connected to circuit common. A capacitor 67 couples the undotted terminal of primary winding 22a to circuit common. Arc sensing resistor 24 is connected between circuit common and the lower switches of switching bridge 14. The junction between arc sensing resistor 24 and the switching bridge is connected to arc sensing circuit 70 of FIG. 4.

Control IC 32 senses whether an arc has been established in lamp 20 by examining the signal at terminal P2. As described in U.S. Pat. No. 4,495,446, control IC 32 initiates illumination from filament 13 and couples high frequency pulses to primary winding 22a until after a normal running arc is established in lamp 20 (FIG. 1).

Figure 4:
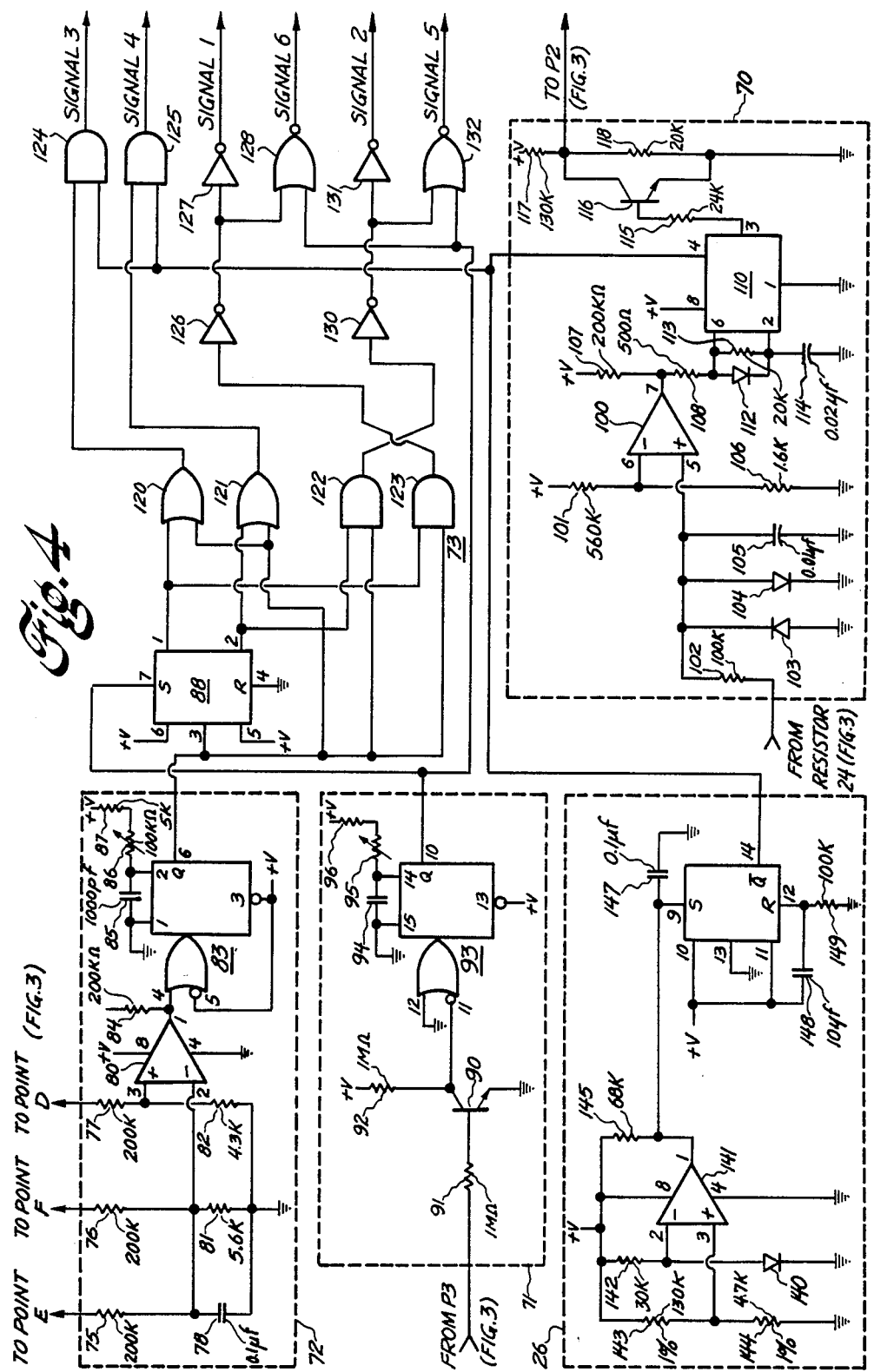
FIG. 4 is a schematic diagram showing the control circuit of FIG. 1 in greater detail.

Turning now to FIG. 4, a schematic diagram of control circuit 25 and over-temperature sensing circuit 26 (both of FIG. 1) will be described. The circuitry shown in FIG. 4 provids 6 logic level control outputs for controlling the bridge switching devices. It also synchronizes the operation of the switching bridge with the starting oscillator in control IC 32 (FIG. 3).

In order to accommodate the different operating modes of arc tube 20, control circuit 25 must be able to make the switching bridge, as shown in FIG. 2, operate in at least the following 3 modes:

(1) A diagonal pair of devices (i.e. FETs 15 and 18) turned on with the other diagonal pair of devices (i.e. FETs 16 and 17) turned off (one phase of the switching bridge); with the on and off pairs being reversed at regular intervals. This is referred to as the normal running mode and refresh is normally not required in this mode.

(2) A diagonal pair of FET devices on with the other diagonal pair of FET devices off continuously (i.e. locked in a single phase) except for refresh periods. This mode is used for starting and warming-up the arc tube. During refresh, the lower FET device of the off diagonal pair is turned on for a short time period. Since the arc tube current is interrupted during refresh, the refresh time must be short enough that the arc does not extinquish during the refresh period.

(3) All FET devices off. This mode is used for protective shut down in case of an over-temperature condition. This mode is achieved by turning both lower devices off.

FIG. 4 includes an arc sensing circuit 70, an oscillator sensing circuit 71, a diode conduction sensing circuit 72 and an over-temperature sensing circuit 26 all connected to a logic means 73.

Diode conduction sensing circuit 72 provides a 120 hertz clock as described in copending applications Ser. Nos. 748,076 and 748,077 filed on June 24, 1985 and assigned to the assignee of the present application, both of which are hereby incorporated by reference. Resistors 75 and 76 are connected to the AC inputs of the diode bridge rectifier and resistor 77 is connected to the DC output of the rectifier. Shortly after the voltage peak of each half-cycle of the 60 hertz AC source, the AC line voltage drops below the voltage on the main energy storage filter capacitor 12 (FIG. 3). At that time the output of comparator 80 (shown as a CA3290 voltage comparator) goes high, triggering a one-shot multivibrator 83 (shown as an MC14528 multivibrator). The Q output of one-shot 83 goes high for a time determined by the combination of capacitor 85 and resistors 86 and 87. The positive going edge of the output pulse from one-shot 83 serves as a clock pulse for initiating switching of the bridge or refresh if the switching bridge is locked in a single phase, while the width of the output pulse of one-shot 83 determines the refresh time, typically 10 to 30 microseconds.

JK flip-flop 88 of logic means 73 (shown as an MC14027 flip-flop) has its clock input (pin 3) connected to the Q output of one-shot 83. The SET input of flip-flop 88 is connected to the output of oscillator sensing circuit 71. The Q output of flip-flop 88 is connected to one input of a two-input OR gate 120 and to one input of a two-input AND gate 123. The NOT Q output of flip-flop 88 is connected to one input of a two-input OR gate 121 and to one input of a two-input AND gate 122. The Q output of one-shot 83 is connected to the remaining inputs of gates 120–123. The output of OR gate 120 is connected to one input of a two-input AND gate 124, the output of which provides SIGNAL 3. The output of OR gate 121 is connected to one input of a two-input AND gate 125, the output of which provides SIGNAL 4. The output of AND gate 122 is inverted twice by inverters 130 and 131 to provide SIGNAL 2. The output of inverter 130 is connected to one input of a two-input NOR gate 132, the output of which provides SIGNAL 5. The output of AND gate 123 is inverted twice by inverters 126 and 127 to provide SIGNAL 1. The output of inverter 126 is connected to one input of a two-input NOR gate 128, the output of which provides SIGNAL 6. The remaining inputs of NOR gates 128 and 132 are connected to the output of oscillator sensing circuit 71. The remaining inputs of AND gates 124 and 125 are connected to the output of over-temperature sensing circuit 26.

The oscillator control IC described in previously mentioned U.S. Pat. No. 4,495,446, measures directly the voltage developed across its arc sense resistor to determine whether the arc tube thereof is conducting. Due to the operation of the gate capacitance latch with refresh lamp ballast of this invention, a separate arc sensing circuit 70 is provided as shown in FIG. 4. A resistor 102 couples the signal from the arc sensing resistor to the non-inverting input of a comparator 100 (shown as a CA3290 comparator). The noninverting input of comparator 100 is coupled to circuit common through a diode 103, a diode 104 and a capacitor 105. The inverting input of comparator 100 is connected to a voltage divider comprised of a resistor 101 and a resistor 106. This voltage divider causes comparator 100 to switch output signals at 43 millivolts at the non-inverting input which corresponds to about 36 milliamps of arc tube current. The input circuit to the noninverting input of comparator 100 is a low pass filter with a time constant of about 1 millisecond which eliminates false arc sensing during the refresh cycle of the switching bridge when both sides of the bridge are conducting.

The output of comparator 100 is coupled to pin 6 of a timing circuit 110 (shown as an MC1455 timing circuit) through a resistor 108. A diode 112 and a resistor 113 are connected between pins 2 and 6 of timing circuit 110. Pin 2 is connected to circuit common through a capacitor 114. Timing circuit 110 is configured as a pulse stretcher to prevent false "no arc" signals during starting when some arc tubes operate in an erratic manner. The ouptut (pin 3) of timing circuit 110 is coupled to the base of a transistor 116 through a resistor 115. The collector of transistor 116 is connected to +V through a resistor 117 and is connected to the emitter of transistor 116 through a resistor 118. The emitter of transistor 116 is connected to circuit common. The junction of resistors 117 and 118 provides the output of arc sensing circuit 70 and is connected to P2 of IC32 in FIG. 3. Transistor 116 inverts the output signal from timing circuit 110.

Pin 4 of timing circuit 110 (reset on low voltage) is connected to the output of over-temperature sensing circuit 26. When the output signal from over-temperature sensing circuit 26 goes low, the output signal of timing circuit 110 goes low and the output signal of arc sensing circuit 70 goes high to disable starting oscillator 21 at terminal P2 of FIG. 3.

Oscillator sensing circuit 71 receives its input from the junction of terminal P3 of control IC 32 and the emitter of transistor 60 in FIG. 3. The input signal is coupled to the base of a transistor 90 through a resistor 91. The emitter of transistor 90 is connected to circuit common. The collector of transistor 90 is coupled to +V through a resistor 92 and is connected to the negative going trigger input of a retriggerable one-shot multivibrator 93 (shown as an MC14528). The Q output of one-shot 93 is connected to the SET input of flip-flop 88 and to NOR gates 128 and 132. Transistor 90 operates as an inverting amplifier. Negative going transitions from transistor 90 trigger one-shot 93, thus setting its Q output during operation of the starting oscillator. Capacitor 94 and resistors 95 and 96 connected to one-shot 93 set the pulse duration of one-shot 93 long enough to allow a warm up period of the arc tube before initiating switching of the switching bridge. A typical delay is about 15 seconds, but the actual time required will vary with arc tube size, operating conditions and arc tube ingredients.

In operation of the circuit of FIG. 4, during a starting condition (i.e. starting circuit 21 of FIG. 1 is on and the output of oscillator sensing circuit 71 is high), flip-flop 88 is set by the output signal from oscillator sensing circuit 71. Assuming that the output signal of over-temperature sensing circuit 26 is high (i.e. no over-temperature condition exists), the switching bridge will be locked in a single phase. As shown in FIG. 5, the Q output signal of flip-flop 88 is high and the NOT Q output is low. Each time the diodes of the diode rectifier turn off, a brief output pulse is produced by one-shot 83. During starting, SIGNAL 3 is continuously high, SIGNALs 1 and 4 have brief output pulses coincident with the output pulses of one-shot 83, and SIGNALs 2, 5 and 6 are continuously low.

After starting and warm-up (when the output signal of one-shot 93 goes low), normal switching of the switching bridge begins. The outputs of flip-flop 88 are toggled each time the diodes of the diode rectififer turn off. The pulse duration of one-shot 83 provides an overlap time when both SIGNALs 3 and 4 are high as shown in FIG. 6.

Returning now to FIG. 4, over-temperature sensing circuit 26 will be described. The noninverting input of a comparator 141 is connected to a voltage divider comprised of a pair of resistors 143 and 144. The inverting input of comparator 141 is connected to a voltage divider comprised of a resistor 142 and a temperature sensitive diode 140. The voltage drop of temperature sensitive diode 140 decreases with increasing temperature. Thus, when the temperature of the ballast rises above a particular trip point determined by the characteristics of diode 140 and the values of resistors 142–144, the output signal of comparator 141 will go high.

The output of comparator 141 is connected to the SET input of a JK flip-flop 146. The output of over-temperature sensing circuit 26 is taken from the NOT Q output of flip-flop 146. Thus, during an over-temperature condition the output of the sensing circuit goes low.

The reset input of flip-flop 146 is coupled to voltage +V through a capacitor 148 and to circuit common through a resistor 149. When power is first applied to the circuit, the combination of capacitor 148 and resistor 149 generates a positive pulse at the RESET input R. The RESET pulse sets the NOT Q output of flip-flop 146 high. The NOT Q output remains high until an over-temperature condition is sensed. Thus, once an over-temperature condition occurs, the circuit will not operate until power is removed and then reapplied. This prevents the lamp from cycling on and off when an over-temperature condition exists.

The foregoing has described a switched AC ballast using a gate capacitance latch for driving the upper devices of the switching bridge. The gate capacitors are refreshed as required by operation of the bridge. The controller circuit provides correct operation of the AC to AC converter of the ballast in accordance with each operating mode of the gas discharge lamp. A plurality of six separate control signals are applied to the switching bridge, thus avoiding the risk that the upper device gate capacitor could be inadvertently discharged at the conclusion of each gate capacitor charge cycle as would be possible if the upper device charge and discharge signals were simple complements of each other. The gas discharge lighting system has reduced EMI since switching occurs while the diodes in the diode rectifier are off. The lighting system also is of reduced cost due to the elimination of a floating power source for driving the upper devices.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the invention be limited only by the scope of the appended claims.

What is claimed is:

1. A controller circuit for controlling an AC to AC converter in a ballast for a gas discharge lighting system, said converter including a diode rectifier for connecting to an AC source and providing a DC output voltage, a current-limiting impedance having one side connected to one side of said rectifier, and a full-bridge switching circuit coupled between the other side of said impedance and the other side of said rectifier for converting said DC voltage to an AC voltage, said full-bridge switching circuit including a pair of converter legs, each of said legs being comprised of a series connected pair of upper and lower semiconductor switching devices, each of said upper devices having a high impedance control electrode, said lighting system including an oscillator having its output terminal coupled to the output terminals of said full-bridge switching circuit for providing electrical energy to start the lamp of said lighting system, said controller circuit comprising:
   a diode conduction sensing circuit coupled to the inputs and the outputs of said rectifier for determining when the diodes in said rectifier are non-conducting;
   an oscillator sensing circuit coupled to said oscillator for signaling a starting condition when said oscillator is operating;
   an arc sensing circuit coupled to said converter and said oscillator for disabliling said oscillator when current in said lamp exceeds a predetermined value;
   a pair of gate capacitance latch driver circuits, each connected to a respective upper switching device and each including a gate capacitor, charging means for charging said gate capacitor and discharging means for discharging said gate capacitor, each of said gate capacitors connected between the control electrode and a second electrode of its respective upper switching device; and
   logic means for generating control signals to operate said lamp in starting and normal running conditions, said logic means being coupled to said diode conduction sensing circuit, said oscillator sensing circuit, said driver circuits and said lower switching devices, said logic means locking said full-bridge switching circuit in a single phase during a starting condition while simultaneously refreshing the upper switching device of the phase which is conducting each time said rectifier diodes become non-conducting during said starting condition, said logic means reversing the phase of said full-bridge switching circuit each time said rectifier diodes become non-conducting during a normal running condition.

2. The controller circuit of claim 1 wherein said logic means is coupled to each of said gate capacitors and generates a first control signal for charging a first one of said gate capacitors, a second control signal for charging a second one of said gate capacitors, a third control signal for turning on and off one of said lower switching devices, a fourth control signal for turning on and off the other lower switching device, a fifth control signal for discharging said first gate capacitor and a sixth control signal for discharging said second gate capacitor.

3. The controller circuit of claim 2 wherein each of said charging means is comprised of a diode having its cathode connected to the control electrode of its respective upper switching device and its anode coupled to said logic means, and wherein each of said discharging means is comprised of a discharge switch having its outputs coupled across a respective capacitor and a diode having its cathode connected to the control electrode of the respective discharge switch and its anode coupled to said logic means.

4. The controller circuit of claim 3 further comprising:
   an over-temperature sensing circuit coupled to said logic means and said arc sensing circuit for turning off said lower switching devices and disabling said oscillator when the temperature in said ballast exceeds a predetermined temperature.

5. A gas discharge lighting system comprising:
   a diode rectifier for connecitng to an AC source and for providing a DC output voltage;
   a current-limiting impedance having one side connected to one side of said rectifier;
   a full-bridge switching circuit connected between the other side of said impedance and the other side of said rectifier for converting said DC voltage to an AC voltage, said full-bridge switching circuit including a pair of converter legs, each of said legs being comprised of a series connected pair of upper and lower semiconductor switching devices, each of said upper devices having a high impedance control electrode;
   a gas discharge lamp coupled between the outputs of said full-bridge switching circuit;
   an oscillator having its output terminals coupled to the output terminals of said full-bridge switching circuit for providing electrical energy to start said lamp;
   a diode conduction sensing circuit coupled to the inputs and the outputs of said rectifier for determining when the diodes in said rectifier are non-conducting;
   as oscillator sensing circuit coupled to said oscillator for signaling a starting condition when said oscillator is operating;
   an arc sensing circuit coupled to said full-bridge switching circuit and to said oscillator for disabling said oscillator when current in said lamp exceeds a predetermined value;

a pair of gate capacitors latch driver circuits, each connected to a respective upper switching device and each including a gate capacitor, charging means for charging said gate capacitor and discharging for discharging said gate capacitor, each of said gate capacitors connected between the control electrode and a second electrode of its respective upper switching device; and logic means for generating control signals to operate said lamp in starting and normal running conditions, said logic means being coupled to said diode conduction sensing circuit, said oscillator sensing circuit, said driver circuits and said lower switching devices, said logic means locking said full-bridge switching circuit in a single phase during said starting condition while simultaneously refreshing the upper switching device of the phase which is conducting each time said rectifier diodes become non-conducting during said starting condition, said logic means reversing the phase of said full-bridge switching circuit each time said rectifier diodes become non-conducting during a normal running condition.

6. The lighting system of claim 5 wherein each of said charging means is comprised of a diode having its cathode connected to the control electrode of its respective upper switching device and its anode coupled to said logic means, wherein each of said discharging means is comprised of a discharge switch having its outputs coupled across a respective gate capacitor and a diode having its cathode connected to the control input of the respective discharge switch and its anode coupled to said logic means, and wherein said logic means generates a first control signal for charging a first one of said gate capacitors, a second control signal for charging a second one of said gate capacitors, a third control signal for turning on and off one of said lower switching devices, a fourth control signal for turning on and off the other lower switching device, a fifth control signal for discharging said first gate capacitor and a sixth control signal for discharging said second gate capacitor.

7. The lighting system of claim 6 wherein said upper and lower semiconductor switching devices are comprised of field-effect transistors.

8. The lighting system of claim 6 wherein said upper and lower semiconductor switching devices are comprised of insulated-gate transistors.

* * * * *